April 2, 1935. H. B. ANGLEMEYER Re. 19,511

AUTOMOTIVE AIR CLEANSING DEVICE

Original Filed Feb. 12, 1929

Inventor

H. B. Anglemeyer

By Clarence O'Brien

Attorney

Reissued Apr. 2, 1935 Re. 19,511

UNITED STATES PATENT OFFICE 19,511

AUTOMOTIVE AIR CLEANSING DEVICE

Herman B. Anglemeyer, Detroit, Mich., assignor, by direct and mesne assignments, to The First National Bank of Pomona, Pomona, Calif., a corporation, as trustee Original No. 1,781,742, dated November 18, 1930, Serial No. 339,374, February 12, 1929. Application for reissue August 20, 1932, Serial No. 629,735

10 Claims. (Cl. 183—11)

This invention relates to an appliance which may be conveniently referred to in the art as an automotive air cleansing device, that is an auxiliary structure which is adapted to cleanse air supply to the carburetor to enhance the operation of the motor.

The invention is characterized by numerous advantages. It cleans the air of dust particles that would be injurious to the motor, imposes no restrictions on the carburetor such as would cause the motor to use more gasoline, breaks up the air and mixes it with oil at the same time, insures a positive oil spray at all temperatures and may be operated to warm or heat the air, making the motor more economical in the use of gasoline.

These and other advantages and features of the invention will become more readily apparent from the following description and drawing.

Figure 1:
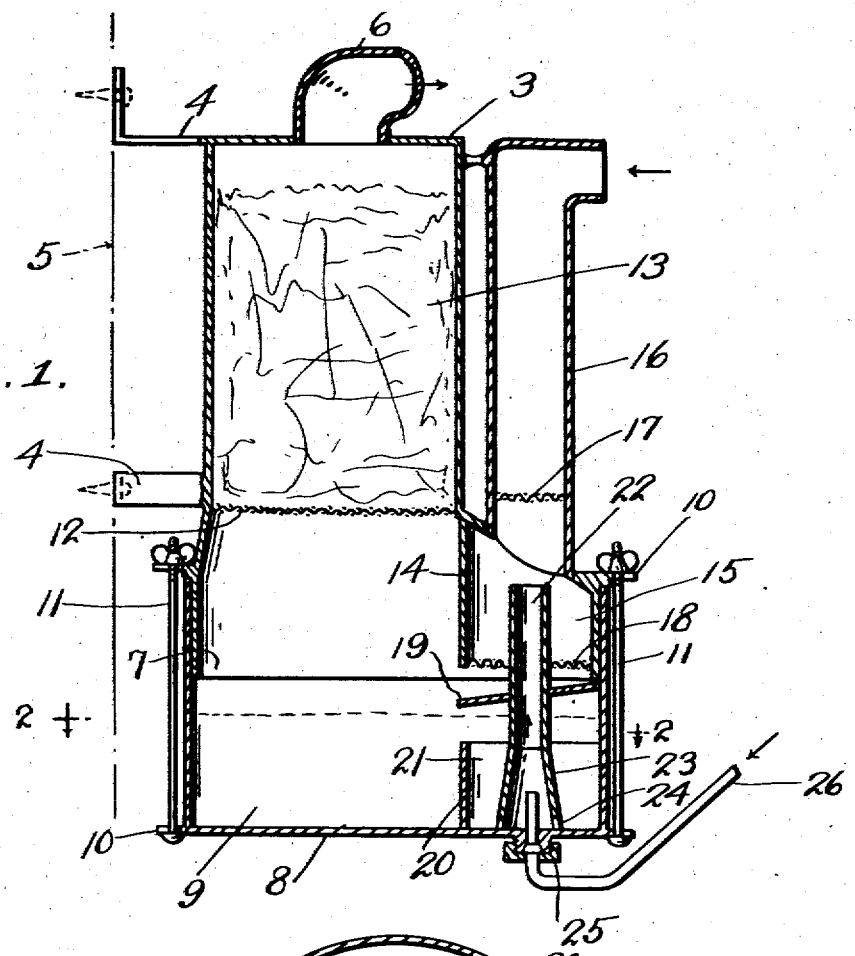
Figure 1 is a vertical sectional view through an air cleansing device constructed in accordance with the present invention.
Figure 2:
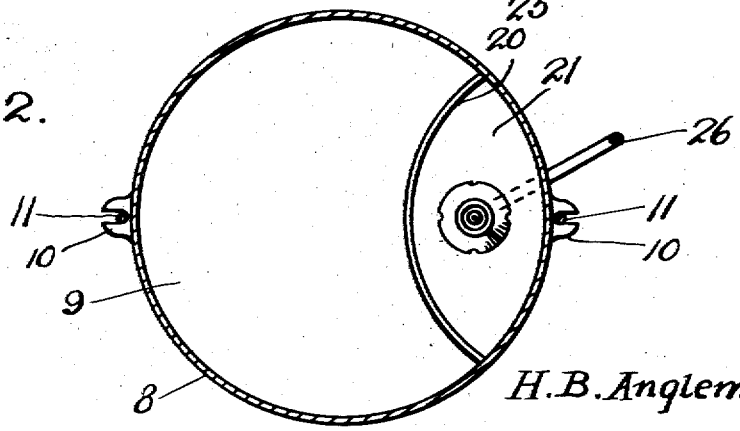
Figure 2 is a horizontal sectional view taken approximately upon the plane of the line 2—2 of Figure 1.

Referring now to the drawing by reference numerals it will be seen that the reference character 3 designates a suitably shaped casing having outstanding attaching brackets 4 connected with an appropriate relatively stationary support 5. The casing is provided at its top with a clean air conduit or outlet 6 and provided at its bottom with a skirt-like portion 7 fitting telescopically into a cup-like liquid container 8 adapted to contain a predetermined quantity of oil in the space 9 and form an oil sump. The cup-like container 8 and the skirt portion of the casing are provided with outstanding lugs 10 with which connecting bolts 11 are connected to hold the two parts in this telescopic relation. Within the casing is a screen 12 forming an upper compartment which contains a filtering wad of material 13 of appropriate texture. This is of porous nature and allows the air to pass upwardly therethrough and removes the oil particles from the air. The reference character 14 designates an arcuate partition which defines an air and oil mixing or oil screen chamber 15 at the bottom of the air intake pipe or tube 16. A strainer 17 is arranged in this tube. A similar strainer 18 is arranged in the bottom of the mixing chamber, and beneath this is a flange 19 which functions as a baffle plate as well as an anti-splash guard for the oil. Incidentally a normal oil level is maintained just beneath this plate 19. The plate 19 is carried by the upstanding wall of the cup-like receptacle 8. Inside of this receptacle is an arcuate partition wall 20 defining an oil reservoir or trough 21. Extending up from this and into the chamber 15 is an oil induction spray tube 22 which may be conveniently designated as a percolating tube. This has a flared bottom 23 and oil intake ports 24. At this point is an appropriate stuffing box or packing gland 25 to which a hot air pipe 26 is connected. The hot air may be gas from the exhaust manifold of the engine. In any event a motive gas under pressure is employed. This pipe is in turn connected at its opposite end (in a manner not shown) with the exhaust manifold. It is intended to supply a stream of hot air into the tube 22.

In operation the atmospheric air enters through the intake of the air supply tube 16 and passes in a stream through chamber 15. The stream of hot air or exhaust gas passes through the pipe 26, acts on the oil column within the percolating tube 22, and causes the oil to literally boil and to bubble upwardly through the tube to provide an oil spray in the oil screen chamber. Here the incoming stream of air passes through the oil spray screen, mixes with the oil and then sweeps down through the screen 18 against the baffle 19 and the surfaces of the oil in the chamber 9. It then passes upwardly through the screen 12 and the filter material 13 and out through the discharge pipe 6 through the motor. It is thus cleansed of dust and dirt particles.

It is obvious that the feature of the invention is the oil screen chamber having a spray tube, for illustration a so-called percolator which operates somewhat similar to a percolator in an ordinary coffee pot. It is thought, however, that persons skilled in the art to which the invention relates will be able to obtain a clear understanding of the invention after the description has been read in conjunction with the drawing. Therefore, a more lengthy description is regarded unnecessary.

Minor changes in size, shape and rearrangement of details coming within the field of invention claimed may be resorted to in actual practice if desired.

Having thus described the invention, what I claim as new and desire to secure by Letters Patent is:—

1. In an air cleansing device of the class described, a casing provided at its top with a cleansed air outlet and provided on one side with an atmospheric air intake pipe, an oil screen chamber at the lower end of said pipe, an oil trough in said casing beneath said chamber, an oil elevating tube in said trough having its upper end extending into said chamber, and a heating pipe connected with said tube.

2. In an air cleansing device of the class described, a casing provided at its top with a cleansed air outlet and provided on one side with an atmospheric air intake pipe, an oil screen chamber at the lower end of said pipe, an oil trough in said casing beneath said chamber, an induction oil elevating tube in said trough having its upper end extending into said chamber, and a motive gas pipe connected with said tube, together with a baffle plate interposed between the oil screen chamber and trough.

3. In a structure of the class described, a cup-like receptacle, a casing including a straight portion telescopically fitted into said receptacle, said receptacle being provided with an arcuate partition defining an oil trough and being further provided with an upstanding ported oil percolator tube, and a hot air heating pipe connected with said tube, said casing being provided with a partition disposed above said first named partition and defining an oil screen chamber, said percolating tube having its discharge end extending into said chamber, an atmospheric air intake pipe on said casing discharging into said oil screen chamber, and a cleansed air outlet connected with said casing.

4. In a structure of the class described, an upright casing with an oil sump at the bottom and having a clean air outlet at the top, an atmospheric air inlet, and an oil screen chamber with which said inlet is connected together with motive gas operated means in said casing for supplying oil spray to said oil screen chamber and means at the top of said casing to filter out oil from the air and return it to said sump.

5. In an automotive appliance of the class described, comprising an upright casing with an oil sump at the bottom and having a cleaned air discharge at the top, an atmospheric air intake, an internal oil screen chamber disposed intermediate the sump and air intake, an induction oil spray tube extending into said chamber, and means at the top of said casing to filter out oil from the air and return it to said sump.

6. In an air cleansing device of the class described, a casing provided with an oil sump at the bottom and at its top with a cleansed air outlet and provided on one side with an atmospheric air intake, an oil screen chamber intermediate said intake and sump, an oil trough in said casing beneath said chamber, an oil induction tube in said trough having its discharge end disposed to project an oil spray into said chamber, and oil filtering and collecting means in front of said air outlet and in free communication with said sump to return oil collected thereto.

7. In an air cleansing device of the class described, a casing provided at its top with a cleansed air outlet and provided on one side with an atmospheric air intake pipe, an oil screen chamber at the lower end of said pipe, an oil trough in said casing beneath said chamber, an induction oil elevating tube in said trough having its upper end extending into said chamber and a motive gas pipe connected with said tube.

8. In an air cleansing device for internal combustion engines, a casing having an air inlet and an outlet, a liquid sump in said casing between said inlet and said outlet, and a tube for connection with the exhaust of said engine leading to said sump, whereby the liquid may be sprayed across the path of incoming air by exhaust gas.

9. In an air cleaning device for an internal combustion engine, a casing having an air inlet and an air outlet, said casing being arranged to contain a liquid, and conduit means entering said casing below the level of said liquid and discharging exhaust gas from said engine into the liquid in said casing, the gas coming into direct contact with the liquid.

10. In an air cleansing device for use with an internal combustion engine, a casing arranged to contain a cleansing liquid, means in said casing defining a path for air through said casing, and conduit means extending into said casing for discharging exhaust gas from the internal combustion engine directly into said liquid causing said liquid to be sprayed across said air path within said casing.

HERMAN B. ANGLEMEYER.